United States Patent
Garbowski et al.

(10) Patent No.: US 10,124,256 B2
(45) Date of Patent: Nov. 13, 2018

(54) REAL-TIME VIDEO FEED BASED MULTIPLAYER GAMING ENVIRONMENT

(71) Applicant: Peter Garbowski, San Pedro, CA (US)

(72) Inventors: Peter Garbowski, San Pedro, CA (US); Blair Kelly, Toronto (CA); Dirk Farin, Stuttgart (DE); Ryan Nellet, Aliso Viejo, CA (US)

(73) Assignee: Peter Garbowski, Long Beach, CA (US)

( * ) Notice: Subject to any disclaimer, the term of this patent is extended or adjusted under 35 U.S.C. 154(b) by 0 days.

(21) Appl. No.: 15/982,641

(22) Filed: May 17, 2018

(65) Prior Publication Data

US 2018/0264359 A1    Sep. 20, 2018

Related U.S. Application Data

(62) Division of application No. 15/049,808, filed on Feb. 22, 2016, now Pat. No. 9,987,557.

(60) Provisional application No. 62/119,609, filed on Feb. 23, 2015.

(51) Int. Cl.
| | | |
|---|---|---|
| *A63F 13/65* | (2014.01) | |
| *A63F 13/358* | (2014.01) | |
| *A63F 13/803* | (2014.01) | |
| *A63F 13/213* | (2014.01) | |

(52) U.S. Cl.
CPC ............ *A63F 13/358* (2014.09); *A63F 13/65* (2014.09); *A63F 13/213* (2014.09); *A63F 13/803* (2014.09)

(58) Field of Classification Search
CPC ...... A63F 13/65; A63F 13/358; A63F 13/213; A63F 13/803
See application file for complete search history.

(56) References Cited

U.S. PATENT DOCUMENTS

| | | | | |
|---|---|---|---|---|
| 4,817,948 A | * | 4/1989 | Simonelli | A63H 18/00 244/190 |
| 5,015,189 A | * | 5/1991 | Wenzinger, Jr. | G09B 9/048 348/121 |
| 5,555,019 A | * | 9/1996 | Dole | H04N 7/185 348/148 |
| 5,596,319 A | * | 1/1997 | Spry | G05D 1/0231 180/167 |
| 5,865,624 A | * | 2/1999 | Hayashigawa | G09B 9/04 434/29 |
| 5,919,045 A | * | 7/1999 | Tagge | A63F 13/08 434/29 |

(Continued)

OTHER PUBLICATIONS

Wikipedia Article on Video compression picture types, printed Jul. 5, 2018, https://en.wikipedia.org/wiki/Video_compression_picture_types.*

(Continued)

*Primary Examiner* — Corbett B Coburn
(74) *Attorney, Agent, or Firm* — Dorsey & Whitney LLP

(57) ABSTRACT

Methods and systems for real-time video-based multiplayer gaming environments enable operators to remotely control vehicles over a network comprising a base station and a server. Cameras may record and transmit encoded video relating to the vehicles for display at a remote console. In response, the operator is able to input commands to remotely control the operation of the vehicle.

6 Claims, 4 Drawing Sheets

(56) References Cited

U.S. PATENT DOCUMENTS

| | | | | |
|---|---|---|---|---|
| 6,568,983 B1* | 5/2003 | Peters | A63H 17/36 | 104/84 |
| 6,954,695 B2* | 10/2005 | Bonilla | B60G 17/0195 | 340/12.5 |
| 7,050,889 B2 | 5/2006 | Bonilla et al. | | |
| 7,402,964 B1* | 7/2008 | Calhoun | A63H 30/04 | 318/11 |
| 9,987,557 B2 | 6/2018 | Garbowski et al. | | |
| 2002/0187726 A1* | 12/2002 | Yamaguchi | A63H 17/395 | 446/454 |
| 2003/0233449 A1* | 12/2003 | Bonilla | A63H 17/395 | 709/224 |
| 2004/0213349 A1* | 10/2004 | Zador | G06T 9/008 | 375/240.22 |
| 2006/0271251 A1* | 11/2006 | Hopkins | A63H 30/04 | 701/23 |
| 2007/0293124 A1* | 12/2007 | Smith | A63H 17/02 | 446/454 |
| 2008/0227500 A1* | 9/2008 | Heyworth | G06Q 30/0267 | 455/566 |
| 2009/0002379 A1* | 1/2009 | Baeza | G06T 1/20 | 345/522 |
| 2009/0003446 A1* | 1/2009 | Wu | H04N 19/176 | 375/240.16 |
| 2009/0005167 A1* | 1/2009 | Arrasvuori | A63H 33/042 | 463/40 |
| 2012/0191805 A1* | 7/2012 | Fee | H04N 21/2343 | 709/217 |
| 2012/0230390 A1* | 9/2012 | Akkor | H04N 21/23655 | 375/240.02 |
| 2013/0045804 A1* | 2/2013 | Ruke | A63G 31/00 | 463/42 |
| 2014/0035736 A1* | 2/2014 | Weddle | G05D 1/005 | 340/407.2 |
| 2014/0277850 A1* | 9/2014 | Jobs | B63H 19/00 | 701/2 |
| 2015/0031268 A1* | 1/2015 | Waites | A63H 30/04 | 446/454 |
| 2015/0210387 A1* | 7/2015 | Ling | B64C 39/024 | 701/2 |
| 2016/0080951 A1* | 3/2016 | Lindoff | H04W 28/02 | 455/418 |
| 2017/0054725 A1* | 2/2017 | Manley | H04L 63/10 | |
| 2017/0155907 A1* | 6/2017 | Baeza | H04N 19/13 | |
| 2017/0178518 A1* | 6/2017 | Foladare | G08G 5/0034 | |
| 2017/0180040 A1* | 6/2017 | Wang | H04B 7/265 | |
| 2017/0280161 A1* | 9/2017 | Cai | H04N 19/61 | |
| 2017/0320215 A1* | 11/2017 | Strandberg | B25J 13/006 | |

OTHER PUBLICATIONS

Franche, J-F and Stéphane Coulombe. "A multi-frame and multi-slice H.264 parallel video encoding approach with simultaneous encoding of prediction frames." 2012 2nd International Conference on Consumer Electronics, Communications and Networks (CECNet) (2012): 3034-3038.*

\* cited by examiner

REAL-TIME VIDEO FEED BASED MULTIPLAYER GAMING ENVIRONMENT

CROSS-REFERENCE TO RELATED APPLICATIONS

This application is a divisional of U.S. Non-Provisional application Ser. No. 15/049,808, filed Feb. 22, 2016, now U.S. Pat. No. 9,987,557, which claims priority to U.S. Provisional Application No. 62/119,609, filed Feb. 23, 2015 and entitled "REAL-TIME VIDEO FEED BASED MULTIPLAYER GAMING ENVIRONMENT," the entireties of which are hereby incorporated by reference for all purposes.

BACKGROUND

Typical multiplayer gaming is conducted in virtual environments rendered on a client machine and managed by a host server. While this form of multiplayer gaming is popular, virtual environments present gameplay, graphical, and other limitations. For example, rendering virtual environments requires considerable processing power on a client machine. As another example, virtual environments may be less engaging or interesting to players than real-life environments. There exists a need for a new format of multiplayer gaming that overcomes these limitations.

SUMMARY

According to certain implementations, a method for managing a real-time video feed based multiplayer gaming environment may involve providing a server configured to manage a networked group including the server, a plurality of vehicles, a base station at an operations area, and a plurality of remote consoles. Each of the plurality of vehicles may comprise a camera configured to capture video data. The server may receive a plurality of connection requests from the plurality of remote consoles and associate each of the plurality of remote consoles with one of a plurality of vehicles associated with the operations area. The server may also send a signal to the base station to prepare the operations area and the plurality of vehicles for a match. The sever may facilitate control of the plurality of vehicles by the plurality of remote consoles, which may include the server receiving an input signal from one of the remote consoles and forwarding the input signal to the vehicle associated with the remote console via the base station. The server may also facilitate the display of real-time video information, which may include the server receiving video data from one of the plurality of vehicles and sending the video data to the remote console associated with the vehicle. While facilitating control of the vehicles and the display of real-time video information, the server may dynamically manage resources within and among the networked group. The dynamic management may include encoding, transcoding, and/or decoding the video data according to a network performance metric and/or a processing performance metric corresponding to each of the remote consoles.

DETAILED DESCRIPTION

Figure 1:
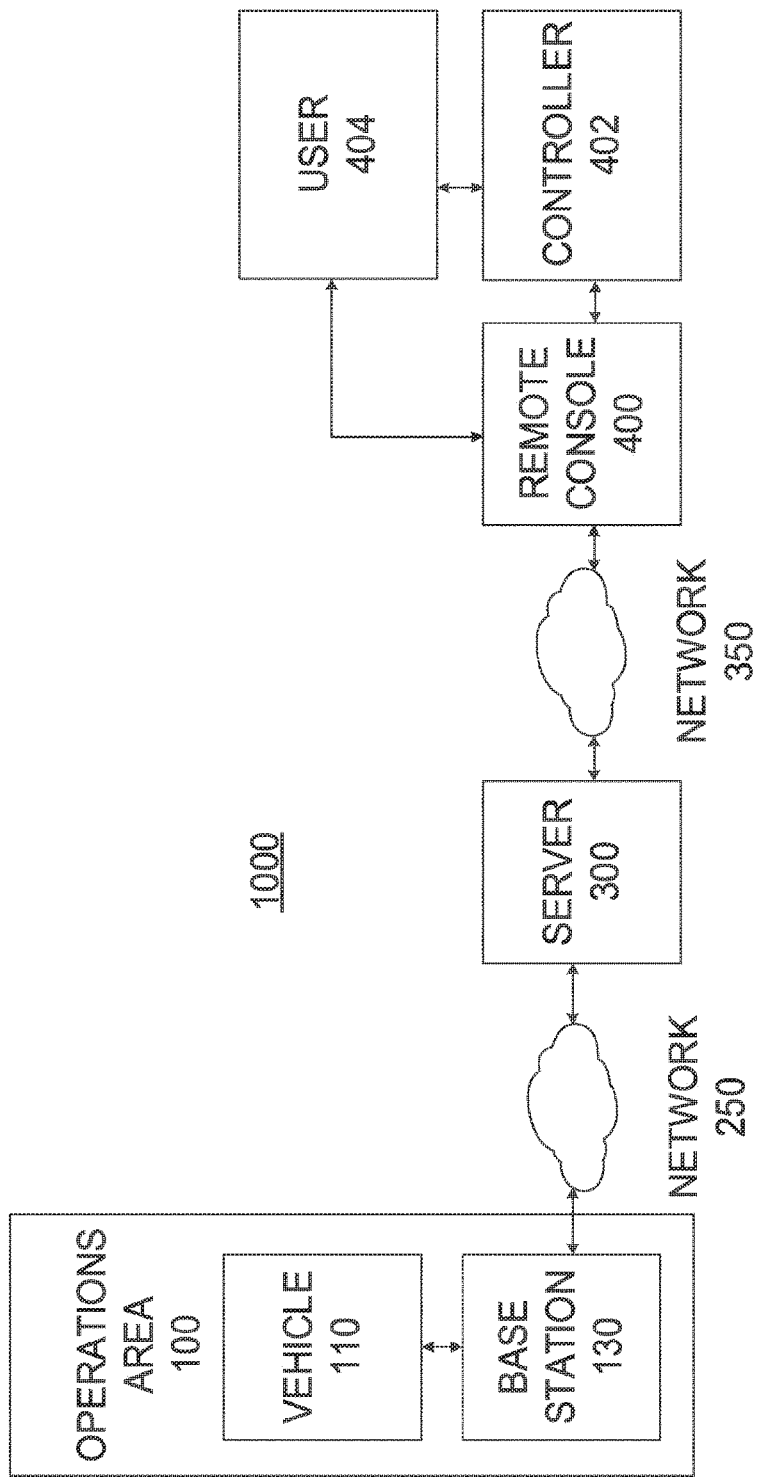
FIG. 1 illustrates a network diagram of a system according to certain implementations.

Disclosed embodiments generally relate to methods and systems for real-time video feed-based multiplayer gaming environments. For example, the systems and methods may enable users to compete over a network in a real-time racing environment. Certain embodiments may relate to vehicles, each comprising a camera that transmits a real-time video feed through a base station and to a server for transmission to a remote console for viewing by the user. In response, the user is able to input commands to remotely control the operation of the vehicle.

By utilizing real-time video feeds transmitted to the user rather than rendered environments, several advantages may be realized. For example, in certain embodiments, the remote console need not render complex virtual environments. Rather, the console need only be configured to display video data, receive user input commands, and perform basic functions. Such a remote console would need fewer resources than would be necessary to render a complex virtual environment.

As another example, controlling a vehicle in a physical environment may obviate the need for the system to implement an anti-cheat system. Anti-cheat systems are often used in virtual multi-player games to prevent a user from modifying the game or game environment in order to gain an unfair advantage. Such systems often require additional networking and processing resources from the server and remote console. By contrast, in a real-real time video system, the vehicles may be physical objects and therefore their physical modification through traditional hacking is unlikely. As such, the system need not implement sophisticated anti-cheat functionality. This may reduce system resource consumption.

Despite certain advantages, real-time video feed-based systems present their own challenges. These challenges may be overcome using some of the systems and methods disclosed herein. For instance, certain disclosed embodiments may utilize various methods to decrease the perceived effect of performance issues and improve the experience of the user 404.

One perceived effect of performance issues is unacceptably long time delay, which may cause jittering, freezing, errors, and other issues. A time delay may be described as the time it takes for an event at one part of the system to be reflected at another end of the system. Increased delay may result in the user providing input that is no longer relevant. For example, if the vehicle is approaching a turn, the operator may input a command to instruct the vehicle to perform the turn. However, if the delay is too high, then the operator may respond to the situation too late and crash the vehicle. An appropriate amount of delay to make the control of the vehicle feel responsive and accurate may be as high as 200 milliseconds (ms); however, this number may be higher or lower depending on the various operating conditions, such as the speed of the vehicle or the preferences of the user.

Performance may generally be classified into two different categories: processing performance and network performance. Processing performance is the rate at which the components can complete an action in response to an input.

For example, processing performance may include the rate at which a remote console may convert received video packets into displayed information for the user. The remote console may need to decode, buffer, or otherwise process the video packets before they are displayed. As another example, the vehicle's camera may need to convert or encode the captured images into video data for transmission.

Network performance is a broad concept that encompasses many factors of network quality. These factors may include network latency, bandwidth, jitter, error rate, dropped packets, out of order delivery, and other factors. Depending on the configuration of the system, different factors may have a greater weight in affecting performance. For example, when downloading a large file, bandwidth may be the most important factor because delay caused by network latency may be small compared to delay caused by waiting for the file to be transmitted at the particular bandwidth rate. By contrast, real-time streaming video may be more affected by latency because each packet is being sent for near-immediate display and latency may set the time distance between each packet being received (e.g., the packet of data may be video information sent from the camera to the remote console for presentation to the operator).

In addition, there is interplay between network performance and processing performance for user experience. For example, there may be a method of encoding video data so that the transmitted packets of information are small enough to travel through the network quickly; however, if additional processing resources are needed to encode and decode the video data, any gains achieved in network performance may be moot in light of decreased processing performance. As shown in this example, certain elements of the system, such as encoding video data, may affect performance in multiple ways.

Certain disclosed embodiments may relate to methods of correcting or alleviating both network and processing performance issues. These embodiments may include encoding or transcoding the video data into particular formats in order to better suit the real-time nature of the system. For example, the video data may be encoded in a format that generates key frames and predictive frames to reduce the amount of network resources needed to transmit high-quality video data in real time. In addition, the video data may be encoded so that the video frames may be processed or decoded in parallel, rather than in series, for example, by splitting each frame into multiple slices. In addition, forward error correction may be utilized to prevent or limit the effect of errors on the experience of the user.

FIG. 1 illustrates a network diagram of a system 1000, including an operations area 100, a vehicle 110, a base station 130, a network 250, a server 300, a network 350, a remote console 400, a controller 402, and a user 404. In certain embodiments, the vehicle 110 is communicatively coupled to the base station 130, which is communicatively coupled to the server 300 over the network 250. The server 300 is also communicatively coupled via the network 350 to the remote console 400, which is communicatively coupled to the controller 402. The controller 402 may be configured to receive input from user 404. In addition, the remote console 400 may be configured for providing information to the user 404. As such, an input from the user 404 to the controller 402 may be sent to the vehicle 110, and the vehicle 110 may respond accordingly. In addition, the vehicle 110 may be configured to transmit data to the user 404 or other components of the system 1000. For example, the vehicle 110 may transmit haptic feedback to the user 404 via controller 402 or the vehicle 110 may capture video and send the video to the remote console 400 for presentation to the user 404.

The communications between the various components of the system 1000 may be through various means, networks, or combinations thereof. While the server 300 has been shown connecting to the base station 130 and the remote console 400 over the network 250 and the network 350, respectively, these networks 250, 350 need not be present at all or may be the same network. All connections shown may be direct or through one or more networks, such as local area, wide area, metropolitan area, cellular or other kinds of networks, including the Internet. The communications may be made through various protocols. In addition, although the components of the system 1000 have been shown as separate blocks, the components may be combined in various combinations, including the same housing. For example, a single device may provide the functionality of both the base station 130 and the server 300.

Remote Console 400

The remote console 400 may be a hardware or software system that, when combined with the controller 402, enables the user 404 to communicate with various components of the system 1000. For example, the remote console 400 may be a mobile device, smart phone, tablet, website, software application, headset, video game console, computer, or other system or combinations of systems. The remote console 400 may include a monitor or other means for displaying real-time video or otherwise communicating information to the user 404.

Controller 402

The controller 402 may be a device, portion of a device, or a combination of devices configured for receiving input from the user 404. The controller 402 may then transmit representations of the input (which may be referred to as simply "input") to the remote console 400 for use throughout the system 1000. The controller 402 may be, for example, a video game controller, a touch screen user interface (e.g., the touchscreen of a phone), keyboard, mouse, microphone, gesture sensor, camera, other device, or combinations thereof. The controller 402 may include various components including but not limited to a steering wheel, a touch screen, a button, a trigger, a pedal, user interface elements, and/or a lever.

Operations Area 100

Figure 2:
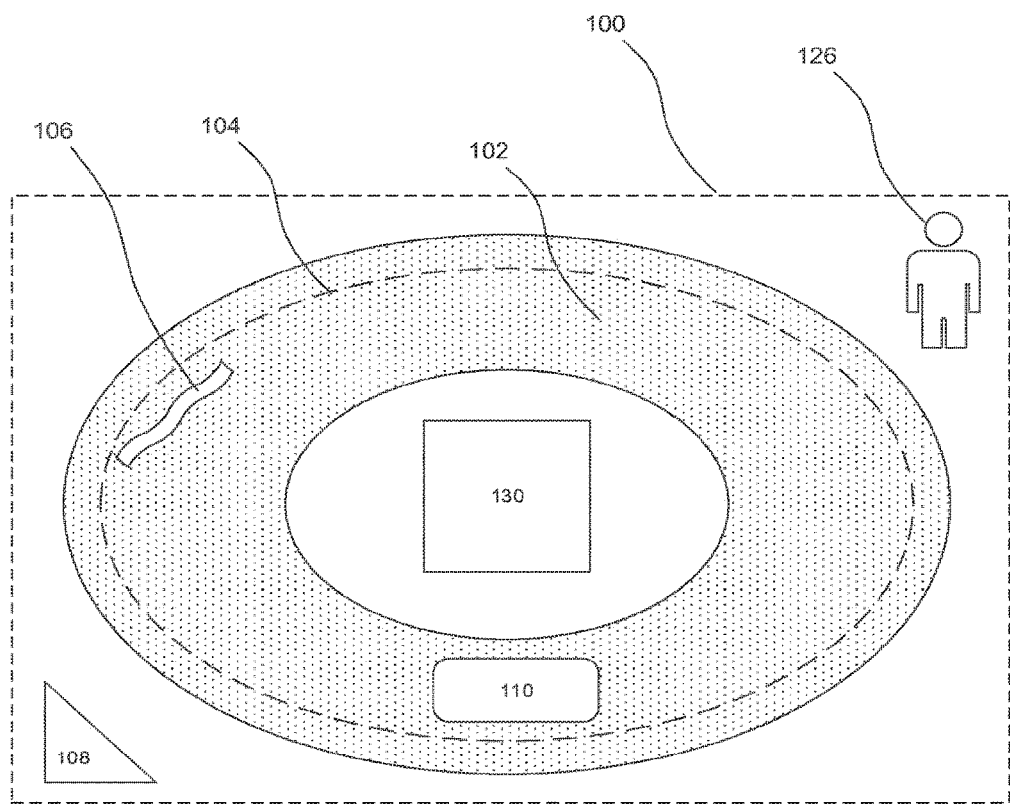
FIG. 2 illustrates an overview of an operations area according to certain implementations.

FIG. 2 illustrates an overview of the operations area 100 according to certain implementations, including a track 102, a barrier 104, a gameplay element 106, a sensor 108, the vehicle 110, a referee 126, and the base station 130. The operations area 100 may be described as the area in which the vehicle 110 operates. The operations area 100 may be defined by various boundaries, such as a range of a wireless signal from the base station 130, a range of the sensors 108, an agreed-upon boundary (such as a boundary set in game rules), a physical boundary (such as a wall), or other boundaries or combinations of boundaries. The operations area 100 as a whole and various components within it may cooperate in order to deliver a particular look, feel, and/or user experience. For example, portions of the operations area 100 may be scaled to match the scale of the vehicle 110 so as to appear that the vehicle 110 is traveling through an appropriately sized real-life environment such as a city, forest, canyon, or other environment.

Track 102

The track 102 may be a predetermined course or route within the operations area 100. For example, the track 102 may be a paved area, a particularly bounded area, an area with particular game features (e.g., a maze, ramps, and jumps), or other regions or combinations of regions. The track 102 may include various sensors, wires, or other components incorporated in the track itself. For example, the track 102 may comprise guide wires or transmitters to update the vehicle 110 or other component of the system to various conditions of the vehicle 110 or operations area 100.

Barrier 104

The barrier 104 may be a virtual or physical boundary that defines a region within the operations area 100. In certain embodiments, the barrier 104 may take the form of a region that interacts with the vehicle 110 to warn of particular conditions. For example, the barrier 104 may comprise a rumble strip to warn the user 404 (for instance through haptic feedback) that the vehicle 110 may soon be leaving the operations area 100. In certain embodiments, the barrier 104 may be a virtual system that transmits warnings to the remote console 400 or otherwise informs the user 404 of particular conditions. These may prevent or dissuade the vehicle 110 from entering a dangerous area, leaving the game area, or otherwise. In certain embodiments, the barrier 104 may also be a boundary between various tracks or operations areas 100. Such barriers 104 may include physical boundaries or special boundaries to prevent interference from wireless communications from base stations 130 of other tracks 102 or operations areas 100.

Gameplay Element 106

Various gameplay elements 106 may be present within the operations area 100. The gameplay element 106 may be an object designed to have an effect on vehicles 110 in the operations area 100. The gameplay element 106 may be something that vehicle 110 may need to drive through, around, over, or otherwise take into account. For example, the gameplay element 106 may be an obstacle such as a pillar, rock, ramp, pole, bumpy area, or water. The gameplay element 106 may be designed so as to be easily removed or configurable. For example, the gameplay element 106 may have actuators that allow the element 106 to be raised, lowered, put away, deactivated, engaged, deployed or otherwise modified. The gameplay element may be communicatively coupled to the base station 130 or other part of the system 1000, such that it may be remotely controlled.

While the gameplay element 106 may physically interact with the vehicle 110 to produce a certain effect, it need not. For example, the gameplay element 106 may be a virtual space defined by a transmitter or other means that, when interacted with, produces an effect on the vehicle. For example, when a component of the system 1000 detects that the vehicle 110 passes near the gameplay element 106, the server 300 sends a command to cause a change in the vehicle 110 or match. For example, the command may be to slow down the vehicle 110 while it is near a particular gameplay element 106. As another example, the user 404 may gain or lose points when the vehicle 110 is near the gameplay element 106.

Sensor 108

Near or within the operations area 100, a sensor 108 or a plurality of sensors 108 may be provided. The sensors 108 may be communicatively coupled to various components of system 1000 and may be used to collect information about conditions within or around the operations area 100. This may include, conditions of the vehicle 110 (e.g., speed or location), weather conditions (e.g., wind speed), conditions near the track 102 (e.g., potential obstacles, interferences, and crashes), potential sources of wireless interference, and other information. The sensor 108 may take various forms. For example, in certain implementations, the sensor 108 is a self-contained computing unit with its own processor, communication system, and other components. In certain implementations, the sensor 108 may take a simpler form and cooperate with other systems or components in order to produce, interpret, and/or communicate data. In some embodiments, the sensor 108 may be a camera or system of cameras placed around the track 102, such as an overhead camera. The sensor 108 may also be a sensor disposed in a region of the track 102 (e.g. a finish line or an out-of-bounds area) determine whether or in what order one or more vehicles 110 crosses the region.

Vehicle 110

The vehicle 110 may generally be any kind of machine configured for motion. The vehicle 110 may be a remotely operated vehicle, such as a remote control car, a flying machine (e.g., a drone or a quad-copter), a boat, a submersible vehicle, or other machine configured for motion. The vehicle 110 may include various means for locomotion, communication, sensing, or other systems.

Referee 126

The referee 126 may be a person who is designated to assist in the operation of the system 1000. The referee 126 perform various tasks including but not limited to, preparing the operations area 100 for play, preparing the vehicles 110 for play, correcting crashes or other problems within the operations area 100, and other activities. A user 404 may also be the referee 126.

Base Station 130

The base station 130 may be located within or near the operations area 100 and may provide various functionalities, including communication with and between the vehicle 110 and the server 300. For example, the base station 130 may be configured to send communications to and receive communications from the vehicle 110. These communications may take the form of wireless transmissions via an antenna operably coupled to the base station 130. The antenna may be configured for transmitting and/or receiving various wireless communications, including but not limited to wireless local area network communications, communications within the 2.4 GHz ultra-high frequency and 5 GHz super high frequency radio bands (e.g., WiFi™ or IEEE™ 802.11 standards compatible communications), frequencies reserved for use with radio controlled vehicles (e.g. 72 MHz, 75 MHz, and 53 MHz), communications compatible with Bluetooth™ standards, near field communications, and other wireless technologies configured for transmitting data. Non-antenna based forms of communication are also possible, including line-of-sight based communication (e.g., infra-red communication) and wired connections. The base station 130 may also use this communication functionality to communicate with the sensor 108. The base station 130 may also include a network interface connection for connecting to a network 250 to which the server 300 is connected.

Depending on the configuration of the various devices, the base station 130 may take various roles. In certain embodiments, the base station 130 may act as a router that passes communication between the server 300, vehicle 110, and/or sensors 108. For example, the base station 130 may receive a turn-left input from the server 300 that is associated with the vehicle 110. The base station 130 may then appropriately pass the input to the vehicle 110, which then interprets and responds to the turn-left input by turning to the left. As another example, the sensor 108 may produce a live, top-down video feed of the track 102, which the sensor 108 transmits to the base station 130, which, in turn, passes the video feed to the server 300. In certain other embodiments, the base station 130 may take a more active role. For example, the base station 130 may be a computer system (or operably coupled to a computer system) that may be configured to perform certain tasks. These tasks may include activities that may be more suited to be performed closer to the vehicle 110 and sensor 108, rather than at the server 300. For example, the base station 130 may be configured for detecting a loss of signal between the base station 130 and the server 300 and respond accordingly.

The response by the base station 130 to loss of signal may include assuming control of the vehicle 110 and buffering certain events occurring in the operations area 100 for recovery at a later time. Buffering certain events may include taking readings from the sensor 108, recording the time the vehicle 110 crossed a finish line, and other events. For example, more than one vehicle 110 may be racing towards a photo-finish when the connection with the server 300 is lost. The base station 130 may be receive and buffer input from one or more sensors 108 (e.g., a sensor 108 monitoring which vehicle 110 crosses the finish line first), so that when the connection is reestablished, a winner is able to be accurately determined. As another example, the base station 130 may buffer the video data recorded by the vehicle 110 in order to show the user 404 what happened while the real-time signal was interrupted.

Vehicle 110

Figure 3:
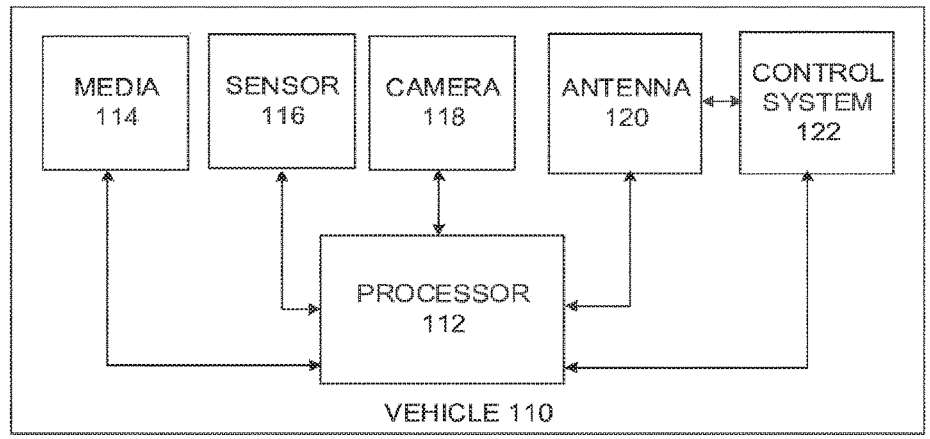
FIG. 3 illustrates a block diagram of components of a vehicle according to certain implementations.

FIG. 3 illustrates a block diagram of components of the vehicle 110, including a processor 112, a media 114, a sensor 116, a camera 118, an antenna 120, and a control system 122. The processor 112 may comprise circuitry configured for performing instructions, such as a computer central processing unit. The processor 112 may be operably connected to the various components 114, 116, 118, 120, 122 of the vehicle 110 to assist in their operations.

In certain implementations, the media 114 is a computer-readable media operably coupled to the processor 112, including but not limited to transitory or non-transitory memory modules, disk-based memory, solid-state memory, flash memory, and network attached memory. The media 114 may store or otherwise comprise data, modules, programs, instructions, and other data, configured for execution or use by the processor 112 to produce results. For example the media 114 may comprise instructions for the operation of the various components of the vehicle 110 and other methods, systems, implementations, and embodiments described herein.

The sensor 116 may be one or more sensors configured for generating data. For example, the sensor 116 may be configured to collect data related to the speed, direction, orientation, or other characteristics of the vehicle 110. After collection, the data may be transmitted directly to the antenna 120, or transmitted to the processor 112. In certain implementations, the processor may take certain actions based on the data, for example, if the vehicle 110 is traveling over a set speed, the processor 112 may send a signal to the control system 122 to slow down the vehicle, or ignore further acceleration commands until the speed decreases. In certain implementations, the processor 112 may package or otherwise transmit the data via the antenna 120 to the base station 130 for communication to other portions of the system 1000. For example, there may be a sensor 116 configured for detecting data relating to vibrations that the vehicle 110 may be experiencing. The processor 112 could direct the vibration data to be transmitted to the controller 402 to provide haptic feedback to the user 404 via the controller 402. In certain instances, the vehicle 110 may include a sensor 16 for collecting or assisting the base station 130 to determine the location of the vehicle 110. For example, the vehicle 110 may include a sensor 16 configured for receiving Global Positioning System (GPS) data to provide a rough location of where the vehicle 110 is located. Certain implementations of the vehicle 110 may include a beacon or other transmitter configured for transmitting a signal that one or more sensors 108 may be able to use to determine the location of the vehicle 110 (e.g., via triangulation).

The antenna 120 may be a component or system of components configured for performing wireless communications. For example, the antenna 120 may enable wireless communication compatible with the base station 130.

The control system 122 may be a system or combination of systems configured for controlling various aspects of the vehicle 110. For example, if the vehicle 110 is a wheeled vehicle, the control system 122 may be configured to send a signal to the motor of the vehicle 110 to increase or decrease speed, send a signal to a steering system to change the direction of motion of the vehicle, and other such controls. The control system 122 may be configured to operate various accessories of the vehicle 110 as well. For example, the control system 122 may be configured to cause the camera 118 to rotate, elevate, or otherwise change. If the vehicle 110 has arms, legs, graspers, cargo, lasers, lights, or other accessories, the control system 122 may be configured to control their activities as well. The control system 122 may receive commands from the processor 112 and/or directly from the antenna 120.

The camera 118 may be a sensor configured for collecting image or video data relating to a scene of interest, including but not limited to a CMOS sensor, a rolling-shutter sensor, and other systems. This video data may be from one or more cameras 118 on the vehicle 110. In addition to or instead of capturing the video data from the camera 118 on the vehicle 110, the video data may be received from a sensor 108 within the operations area 100 configured as a camera. The video may be collected in various formats, including but not limited to a native camera format (e.g., a default or otherwise standard setting for output from a video-enabled camera), a compressed format, a block-oriented motion-compensation-based video compression format (e.g. H.264), a format where each frame is compressed separately as an image (e.g., Motion JPEG), and other formats. The camera 118 may be connected to the processor 112 such that the data may be transmitted to other parts of the system 1000. For example, the camera 118 may be a camera connected to the processor 112 through a USB or other wired connection.

The camera 118 may be attached to an internal or external portion of the vehicle 110 such that the camera 118 is aimed at a scene of interest. Additional camera 118 may be coupled to the vehicle 110 in various locations and directed to additional scenes of interest. For example, there may be cameras 118 directed to capture scenes to the left, right, top, bottom, front, or rear of the vehicle 110. These cameras 118 may be configured to collect data all at once, or be selectively activated by the processor 112 in response to particular events (e.g., the rear-facing camera 118 activates when the vehicle 110 is traveling in reverse). The camera 118 may also be able to capture audio data through a microphone. In addition, one or more cameras 118 may be used to capture three-dimensional video.

Server 300

Figure 4:
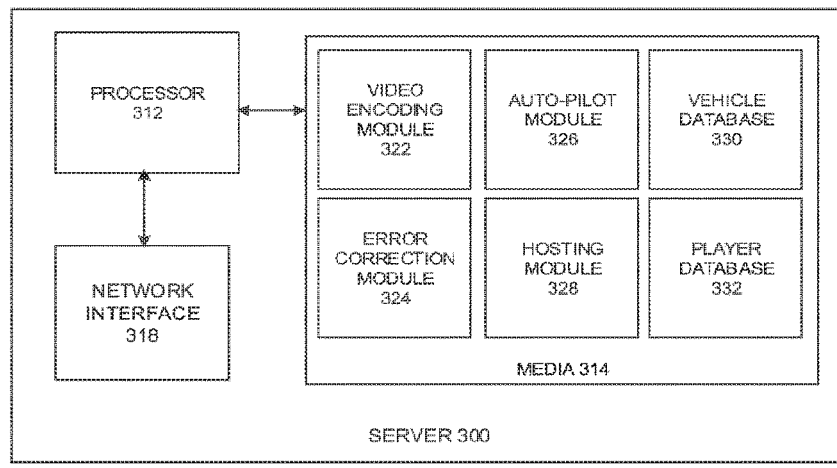
FIG. 4 illustrates a block diagram of a server according to certain implementations.

FIG. 4 illustrates a block diagram of the server 300 of the system 1000. The server 300 of FIG. 4 includes a processor 312 operably coupled to a media 314 and a network interface 318. The processor 312 may be circuitry configured for performing instructions, for example as described above in reference to processor 112. Similarly, the media 314 may be a computer-readable media, for example, as described above in reference to media 114. The network interface 318 may be a hardware component or a combination of hardware and software coupled to the processor 312 that enables the server 300 to communicate with a network, for example the networks 250, 350.

The media 314 may comprise various modules, such as a video encoding module 322, an error correction module 324, an auto-pilot module 326, a hosting module 328, a vehicle database 330, and a player database 332. While the contents of the media 314 are shown as being a part of the server 300, one or more of the contents may be located on and/or executed on media in various other portions of the system 1000, such as media 114 or media located on the base station 130.

The video encoding module 322 may be a module or combination of modules comprising instructions for encoding, decoding, and/or transcoding video data. This may include the various methods described herein and elsewhere, such as multi-slice parallelism, and key and predicted frames.

The error correction module 324 may be a module or combination of modules comprising instructions for correcting errors. The errors may include, transmission errors, encoding errors, decoding errors, transcoding errors, corrupted data, artifacting errors, compression errors, or various other kinds of errors that may be present or introduced into the system 1000.

The auto-pilot module 326 may be a module or combination of modules comprising instructions for controlling or otherwise directing the movement of one or more vehicles 110. The auto-pilot module 326 may use various means for controlling the vehicles 110 including data from sensor 108, sensor 116, camera 118, combined with image recognition, position tracking, artificial intelligence, and other means for understanding the state of the vehicle 110 and directing its behavior.

The hosting module 328 may be a module or combinations of modules that contain instructions for operating the server 300 as a server or host for the operation of the real-time video feed based multiplayer game. For example, the hosting module 328 may comprise instructions for establishing network communications with the various components of the system 1000. These network communications may enable the server 300 to receive input from various components of the system 1000 and forward, process, or otherwise interact with input from the other components. In certain implementations, the hosting module 328 may enable to the server 300 to host a game with particular rules. One set of rules may comprise instructions for operating a race with a group of four vehicles 110 on track 102 and determining a winner based on sensor data from the sensor 108 and/or the sensor 16.

For example, users 404 may initially log in to the server 300 using particular information, such as a user name and password. Based on the user name and password, the server 300 may be able to authenticate the connected user 404 with a particular user identifier stored in the player database 332. The server 300 may then be able to load particular user data associated with the user identifier from the player database 332.

In certain implementations, the hosting module 328 may comprise instructions for preparing to host a game. This may include opening a game lobby and allowing users 404 to join and wait for a game to begin.

In certain implementations, the hosting module 328 comprises instructions for preparing the operations area 100 for a race. This may include moving one or more vehicles 110 to a starting location. Moving the vehicles 110 may be performed by a referee 126 manually moving the vehicles 110 into place, activating the vehicles 110, and/or performing other initial vehicle setup. In certain implementations, the server 300 may send a signal to the vehicles 110 (e.g., through base station 130), containing instructions for automatically preparing the vehicles 110 for a match. This may be performed by, for example, instructions contained within the auto-pilot module 326 and may additionally include running initial diagnostics on the vehicles, commands to move the vehicles 110 into particular locations, and other initial preparation of the vehicles 110 for the particular match. In certain game modes, initialization may include preparing the operations area 100 for a particular game mode. For example, automatically or manually moving or initializing the gameplay elements 106 or other features of a game mode. In certain implementations, the initialization may include activating, testing, calibrating or otherwise initializing the sensors 108 or the base station 130.

The vehicle database 330 may be a database or combination of databases comprising information relating to the vehicles 110 and their operation. The vehicle database 330 may comprise information such as: vehicle type, vehicle location, vehicle capabilities, price, rental price, usage fees, maintenance history, ownership, usage status, usage history, and other information.

The player database may be a database or combination of databases comprising information about the users 404. For example, the database may contain information relating to: user login information, use name, user identifier, user password, remote console identifier, use network connection preferences, user settings, use internet protocol address, user network performance preferences, user processing performance preferences, user controller preferences, vehicle preferences, history of past games, preferred operations areas 100, vehicle information, base station region information, and other data client data.

Decreasing Perceived Network Performance Issues and Improving Operator Experience The system 1000 may be configured through various systems and methods in order to provide real-time video to the user 404 with limited impact from network performance issues to improve operator experience. These systems and methods make take various forms, such as the ones described below.

Video Encoding and Decoding

Certain implementations may utilize particular video encoding methods and systems to optimize the video data for real-time video feed based multiplayer gaming. The video data may be encoded at the camera 118 and/or encoded, transcoded, and decoded at different locations throughout the system 1000, such as at the server 300 via the video encoding module 322. For example, the camera 118 may comprise an onboard processor configured for converting the video data from the sensor on the camera 118 to an initial encoding.

The encoding of the video data may change as the data is sent through the system 1000. For example, the video data may be captured and encoded at a high-quality setting at the camera 118 and subsequently transcoded to a lower-quality or more compressed format. High-quality video data may be described as video data that more accurately reflects the scene of interest than low-quality video data. For example, high-quality video data may be in a high-definition format, such as 1080p, while the low-quality video is in a standard definition format, such as 480i. As another example, high-quality video data may be encoded at a high-frame rate such as 144 frames per second or 60 frames per second, while low-quality video data may be encoded at a low frame rate such as 24 frames per second or lower.

The transcoding process may be used to take into account various conditions within the system 1000, such as bandwidth. If the connection from the vehicle 110 to the remote console 400 has low bandwidth, high-quality video information may be too large to be sent without an unacceptable delay. The video data may be kept in a high-quality format until the system 1000 detects latency or other issues and then transcodes the video data to a more compressed format. For example, the video data may be transmitted at the highest quality possible until network performance issues are detected by the sender, which then transcodes the video based on the perceived network issues. As a specific example, the connection between the vehicle 110 and the base station 130 may be configured for supporting the transfer of high-quality video without a significantly affecting network performance, but sending the same data to the server 300 over network 250 would result in unacceptable latency so the base station 130 transcodes the video data to a format more suitable for the conditions of the network 250. This transcoding may continue until it is detected that the network 250 or other conditions have improved.

Multi-Slice Parallelism

In certain implementations, multi-slice parallelism may be used to reduce latency within the system 1000. While certain video data systems split video data into frames, multi-slice parallelism may be described as the further division of the video data frames into one or more slices. Multi-slice parallelism may help improve processing performance. For example, the slices may be processed concurrently at multiple processors or multiple cores of a single processor. Many modern processors have more than one core (virtual or physical) with each core configured for running a separate process. While, typically, a single frame may only be processed by a single processor, by breaking each frame into slices, separate cores may be able to process different slices of the same frame at the same time. Once each slice is finished processing, the slices are combined into a frame for display or other use. This process may be described as "multi-slice parallelism" and can be used to speed up the processing of frames and enable shorter delay.

Key and Predicted Frames

In certain implementations, the video data may be encoded such that it utilizes special kinds of frames, such as key frames, predicted frames, and/or bi-directional predicted frames. The encoder (e.g., the encoding module 322) may generate predicted frames by examining previous frames and then encoding the predicted frame based on differences between the previous frame and the current frame being encoded. Because the predicted frame is based on changes from the previous frames, a predicted frame may have a smaller size. Bi-directional predicted frames are generated based not only on previous frames, but also frames that come next. Because they are based on both forward and backward differences, bi-directional predicted frames may be even smaller than predictive frames. Key frames are frames that contain data that is not dependent on the content of other frames.

While encoding video data with these frames may result in a small encoded video size, their use in real-time steaming video may introduce certain problems. For example, because bi-directional predicted frames require information based on frames that come next, the waiting for additional frames may result in undesirable delay in the system 1000. For example, a bi-directional predictive frame may be received by the remote console 400, which waits for the next frame before the bi-directional frame can be decoded. However, if the next frame is delayed or dropped, the remote console 400 may be stuck waiting.

In certain embodiments, the video data may be encoded using key frames and predicted frames. As discussed above, the predicted frames may have a smaller size, which may decrease the transmission time. This may result in a situation where the remote console displays multiple predicted frames quickly, but then needs to wait for a key frame. This may cause undesirable periodic stutter in video playback. To alleviate this, the remote console 400 may buffer frames in memory to smooth playback.

Forward Error Correction

During typical networking activity, some packets of data may be delayed, lost, or include an error. While some recipient devices may simply automatically send a request back to the sending device to ask for the particular packet to be sent again, this process may introduce additional delay in the system 1000. In certain embodiments, system 1000 may utilize forward error correction (e.g., as implemented in the error correction module 324) to avoid the need for retransmission of packets. Forward error correction may take various forms. For example, the packets of information may include redundant information such that errors in transmission may be detected and corrected. For example, certain embodiments may utilize parity bits, checksums, cyclic redundancy checks, and other methods of detecting or correcting errors. In certain circumstances, the redundant information may be used to infer information about the affected packet and substantially correct the error to avoid retransmission. In certain other circumstance, the packets may be uncorrectable or take too long to process (e.g., the processing time is longer than the useful life of the packet), so the error correction module 324 may decide to ignore the packet. Similarly, in certain embodiments, the system 1000 may be configured to detect stale or otherwise erroneous user 404 input and engage in corrective action. For example, if a packet containing a command is delayed and arrives after a subsequent command has been entered (such as the user 404 sends a left-turn then a right-turn command but the right-turn command is received by the server 300 or base station 130 first), a component of the system 100 may detect and disregard the subsequent command as stale.

Resource Requirements and Balancing Techniques

The encoding techniques described above and other performance settings of the system need not be static or applied the same across all users. The performance and gameplay settings may be dynamically updated to take into account real-time resource requirements and performance. For example, encoding and transmitting the real-time video data may involve processing, time, and bandwidth resources. While the video data may be encoded in a highly-compressed format, additional time and processor cycles may be needed to achieve the high levels of compression. This may be because the encoding processor may need to spend additional time analyzing the file in order to compress the data to a small size. Similarly, the decoding processor may need to spend additional time reconstructing the video data from a highly compressed file. The server 300 or other parts of the system 1000 may be able to analyze and predict the effect of certain resource requirements to achieve beneficial results.

For instance, reducing transport time by 2 ms by spending an additional 5 ms compressing the data may not be worthwhile. However, if the remote console 400 has significant processing resources but reduced bandwidth or other network resources, the situation may be different. For example, particular encoding methods may be beneficial if the method reduces transport time by 10 ms even though it requires an additional 5 ms to encode and decode the data.

As another example, for unreliable connections that frequently lose or damage packets, including additional error correction information or other redundancies may be worthwhile. While encoding and decoding the video data packets with such information may increase processing time and bandwidth requirements, the ability for the system 1000 to recover the information may improve the user experience. By contrast, if a user 404 has a generally stable connection, the user 404 may be able to tolerate the effect of a few lost frames if processing and network resource requirements are eased.

In addition, certain compression or encoding methods may have an effect on video quality. For example, certain compression or encoding methods may be both network and processor resource efficient but produce undesirable artifacts or compression errors that reduce quality. Tolerance for artifacting and other compression errors may vary on a user-by-user basis. As such, the server 300 may give users 404 the option of selecting the level of quality that they prefer.

Figure 5:
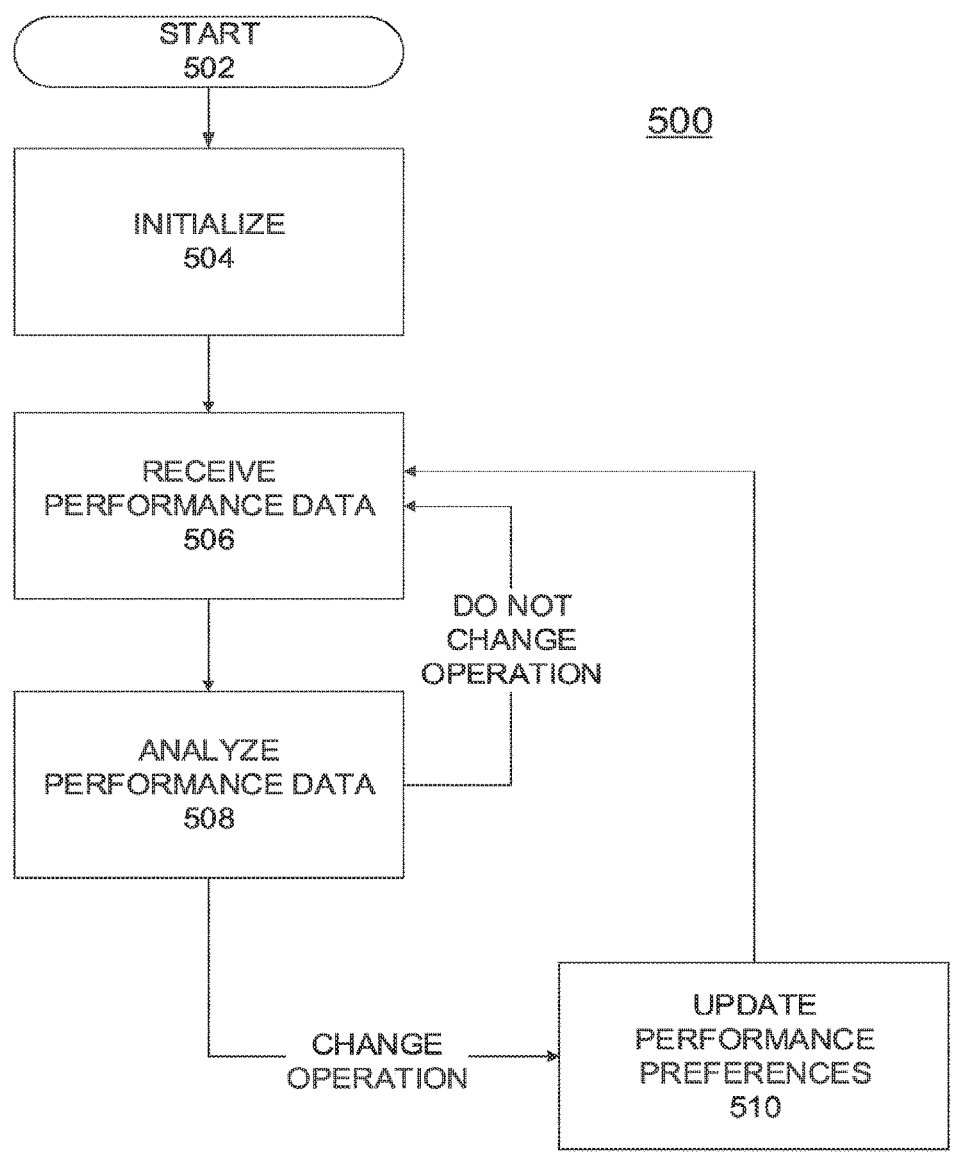
FIG. 5 illustrates a flow diagram of a method for dynamically adjusting performance according to certain implementations.

FIG. 5 illustrates an example method for dynamically adjusting performance 500. The method 500 begins at the start step 502. The method 500 may be started at various points in time or in response to various events. For example, the method 500 may be started when a user logs in to the service, at the user's request, when a match is selected, when a match is started, during a match, after a period of instability, during a benchmark, at a scheduled time, or at other times.

At step 504, the server 300 is initialized and prepared for adjusting performance. In certain implementations, the initialization includes receiving user data. User data may be data relating to a connected or connecting user 404, such as user login information, user name, user identifier, user password, remote console identifier, network connection preferences or settings, internet protocol address, network performance preferences, processing performance preferences, control preferences, vehicle preferences, history of past games, a target operations area, vehicle information, base station region information, and other data user data. The user data may be received from media within the remote console 400, loaded from the player database 332, received as a response to a query, received as part of a connection, and through other means.

At step 506, the server 300 receives performance data. The performance data may be related to one or both of processing performance and network performance of various components of the system 1000, including but not limited to the vehicle 110, the base station 130, the server 300, and the remote console 400. Network performance data may include data relating to network latency, bandwidth, jitter, error rate, dropped packets, out of order delivery, and other factors affecting network performance. Processing performance data may include data relating to processor speed, processor usage, RAM speed, RAM availability, video decoding speed, number of frames in a buffer, time between a frame arriving at the remote console 400 and the frame being displayed, and other factors affecting processing performance. Receiving performance data may continue for a particular amount of time, until a particular event occurs, or based on another factor. For example, the performance data may be analyzed every 10 seconds or once a change over a particular threshold is reached.

The server 300 may receive performance data in different ways. In certain implementations, the server 300 may passively receive data from one or more components of the system 1000. For example, a component of the system 1000 may periodically send performance data to the server 300. The server 300 may also receive information from the packets that it receives as a part of its operation. For example, a packet of video data received from a component may be analyzed for information relating to performance (e.g. a timestamp, testing for artifacting or other errors in the data that may indicate an issue). The server 300 may also receive the information through direct requests. For example, the server 300 may ping a component to determine latency, send a file to test bandwidth, send a video file for decoding to test decoding speed, requesting a component to perform a diagnostic test, request a component ping another component of the system 1000, and other means of requesting information.

At step 508, some or all of the received performance data is analyzed. This may include various steps or processes to determine the meaning of the received data. For example, with regard to diagnosing network performance based on a ping, several factors may be analyzed, including whether the packets are being received at all, the amount of the delay in the round-trip of the ping (e.g. whether the response time is greater than 400 ms), the duration of a particular delay (e.g. whether the response time is greater than 400 ms for longer than 10 seconds), or other factors.

In certain implementations, step 508 may include comparing raw performance numbers. For example, the current latency between the server 300 and the remote console 400 may be 80 ms and the previous value was 60 ms. This may indicate that there is a latency issue in the network and that one or more settings may need to be updated. However, this fluctuation may be a normal fluctuation in the performance of the network that will stabilize or otherwise be unnecessary to address. In that situation, updating performance settings for every change in performance may be undesirable to the user 404 or introduce its own performance issues. As such, the server 300 may use historical data or statistical analysis to determine the appropriateness or desirability of changing settings.

For example, the server 300 may compare the current latency with the typical historical average latency, median latency, standard deviation, or other data. Historical data may include data from previous gameplay sessions, the same session, other users 404 in similar circumstances, and other previously collected information. Further, the server 300 may use the duration of a performance to determine whether a change should be made. For example, in some circumstances, an increase in latency for 2 seconds may be small enough to be ignored, while an increase in latency for 5 seconds may be large enough to need to be addressed.

In certain embodiments, this time interval may be based on historical performance or stored settings. A particular remote console 400 may typically undergo increases in latency for 5 seconds before returning to an approximately normal setting that need not be addressed. However, there may be another user 404 with a more stable connection where an increase in latency for even 1 second is atypical, and therefore the server 300 may update performance settings after only 1 second. This is because there may be natural fluctuations in network performance. In some stable connections (e.g., a T1 connection), fluctuations may be rare and short, while unstable connections (e.g., connecting over cellular data) may frequently have large fluctuations. In certain embodiments, the severity of the change may be analyzed. This may include determining whether certain change thresholds have been reached.

In certain implementations, step 608 may include calculating a performance score for one or both of the processing performance and the network performance. The performance score may include heuristic calculations based on received performance data. For example, a latency of between 0 ms and 50 ms receives a score of 10, between 50 ms and 100 ms receives a score of 5, between 100 ms and 200 ms receives a score of 2, and a latency greater than 201 ms receives a score of 0. The score need not be tied to directly measured values. For example, scores can be given based on the stability of the connection (e.g., the standard deviation of measured latency is small), or other factors. The sever 300 may utilize change in score to determine if an alteration should be made. The server 300 may make alterations to attempt to maximize or minimize certain scores.

In certain implementations, the analysis includes determining the location of performance issues. For example, determining the network performance between the base station 130 and the server 300 or between the server 300 and the remote console 400. As another example, the server 300 may determine where a processing performance issue is located, for example, at the vehicle 110, at the base station 130, at the server 300, at the remote console 400, or in other locations.

Based on the analyzed performance data, the server 300 determines whether to change the operation of the system 1000 or to leave it substantially the same. If the server 300 determines that the performance parameters need to be changed, then the process goes to step 510.

At step 510, performance preferences and/or settings are updated. How the performance preferences are changed, may be based on the analysis of the performance data in step 608.

For example, the server 300 may take different actions depending on the location of the problem. In certain implementations, the server 300 may dynamically allocate resources or resource requirements throughout the system 1000. Resources may include additional bandwidth, priority processing, and other resources available to the server 300, base station 130, or other parts of the system 1000. For example, if the issue is between the server 300 and base station 130, then the server 300 may instruct the base station 130 to automatically increase compression to ease network issues at the cost of requiring additional resources to decode. Once the data packets reach the server 300, the server 300 may utilize its increased processing performance to transcode the data into an easier to decode format for use by the remote consoles 400.

As another example, if the base station 130 is having a processing or networking issue, the server 300 may send an alert to the referee 126, decrease the number of vehicles 110 that may be playing the game concurrently at the base station 130 (e.g., at the start of the next game), activate an additional or backup base station 130, deactivate one or more sensors, send an instruction to the vehicle 110 to send video of lower quality, alter an encoding parameter at the base station 130, or make other changes.

If the server 300 is having a processing or network issue, the server 300 may send an alert to a referee 126, decrease the number of vehicles 110 that may be playing the game concurrently at the base station 130 (e.g., at the start of the next game), activate an additional or backup server 300, deactivate one or more sensors 108, send an instruction to the vehicle 110 or base station 130 to send video of lower quality, alter an encoding parameter at the server 300, or make other changes.

In certain implementations, the server 300 may address network issues by altering the performance of the vehicles 110. For example, game rules or difficulty settings may dictate that that all users 404 should have at least 1 second to identify a gameplay element 106 and determine what to do. For instance, the operations area 100 may have a quickest reaction time moment where, after rounding a corner, there is a 10 meter straightaway and then an obstacle that must be avoided. If a maximum speed for the vehicles 110 is 9 meters per second, a vehicle 110 traveling at maximum speed would travel the 10 meters in approximately 1.11 seconds. If a user 404 has a delay of 100 ms, then the user 404 has approximately 1.11 seconds minus 100 ms or 1.01 seconds to make a decision. However, if the user 404 with the highest delay has a delay of 200 ms, then that user 404 would have only 0.91 seconds to react, which is below the threshold. The server 300 may detect this scenario based on the latency of the user 404 and readjust the speed of some or all of the vehicles 110 in order to ensure that all users 404 meet the minimum time. For example, the server 300 may reduce the maximum speed of all vehicles 110 to 8 meters per second. At this speed, the user with 200 ms of delay would have 1.25 seconds minus 200 ms or 1.05 seconds to make a decision, a value above the threshold.

As another example, the speed of the vehicles 110 may be adjusted so as to ensure that all users 404 must make a decision within substantially the same calculated reaction time. For example, a variance of up to 10% may be acceptable as could other values depending on chosen rules or user preferences. That is, vehicles 110 with lower delays or network performance issues, have the maximum speed of the vehicle 110 increased to reduce the amount of time that the user 404 has to make a decision. As another example, the server 300 could personalize the speed of the vehicles 110 and then adjust the time or score at the completion of the match based on the speed of a vehicle 110.

For example, a vehicle 110 that completed the course in 3 minutes at a speed of 10 meters per second may reach the finish first against a vehicle 110 that completed the course in 3 minutes 10 seconds at a speed of 8 meters per second; however, the server 300 may determine that the second-place vehicle 110 is the winner because it performed better considering its speed. This may be determined by, for example, declaring the winners based on how little of distance was traveled. In the above scenario, the finished-first vehicle 110 may have traveled the equivalent of 1,800 meters, but the finished-second vehicle 110 traveled only 1,520 meters and therefore would be declared the winner.

In certain cases, the server 300 may dynamically update performance parameters on a per-vehicle 110 basis. For example, by determining, whether the delay should be applied to all of the vehicles 110 or just some. For example, if highest-delay user 404 has been disqualified, lapped, or is otherwise unlikely or impossible to win, the server 300 may exclude that vehicle 110 from the highest-delay vehicle calculation or only slow that vehicle's speed.

Dynamic update of performance parameters need not be limited to altering the speed of vehicles 110. It may include altering the allocation of resources to vehicles 110. As an example, the server 300 may detect that two or more vehicles 110 are racing towards a photo-finish and direct additional resources in order to improve the performance of the two or more vehicles 110. This may be done at the expense of other vehicles 110. As yet another example, the server 300 may shift resources away from vehicles 110 that have already completed the match and are still operating within the operations area 100 (e.g. because the vehicle 110 has crossed a finish line after completing a required number of laps and is taking a victory lap while the other vehicles 110 finish the match).

In certain embodiments, a digital representation of the operations area 100 may be generated and made available to the remote console 400 to allow for accurate control even during periods of increased latency. For example, by default the user 404 sees the video data that is streamed from the vehicle 110, but when experiencing increased latency, the server 300 may detect the latency, cease sending video data, and instead send signals to the console 400 to display a portion of the digital representation based on position information of the vehicle 110 until the latency improves. This may be advantageous because the position data may require less bandwidth and may need to be transmitted less frequently and therefore may be more suitable for high-latency situations.

As another example, an auto-pilot feature (e.g., enabled by the auto-pilot module 326) may activate if the server 300 or another part of the system 1000 detects performance issues. The auto-pilot feature may be provided at various levels of sophistication. The system 1000 may detect high latency with the user 404 and cause the vehicle 110 to gracefully stop motion. This may be useful to prevent the vehicle 110 from crashing and being damaged.

For instance, upon detecting performance issues, a component of the system 1000, (e.g., the base station 130) may transmit a signal to the vehicle 110 that is experiencing the issue to cause the vehicle 110 to gracefully stop. As a specific example, the vehicle 110 may be heading towards a wall of the track 102 at a high speed. If the vehicle 110 does not receive any instructions (e.g., because the user 404 has not sent any instructions, or because the vehicle 110 did not receive any instructions because of a loss of connection with the server 300), the vehicle 110 may be directed by the base station 130 to coast to a stop. However, given a particular measured velocity of the vehicle 110, the vehicle 110 may hit the wall even if the vehicle 110 coasts to a stop. The base station 130 may be able to detect this collision scenario and the loss of connection with the server 300 and send instructions to the vehicle 110 to take maneuvers to avoid the collision and then come to a stop.

In certain embodiments, the auto-pilot feature may direct the vehicle 110 to travel through the operations area 100 in a controlled manner. For example, the auto-pilot may send signals to the vehicle 110 to direct it to a nearby track exit or extraction point. As another example, the auto-pilot may send signals directing the vehicle 110 to travel through the operations area 100 on a predetermined path, such as following the track 102, until connection is restored.

If the server 300 determines at step 508 that it is not desirable to update the performance preferences, then the flow returns to the step of receiving performance data 506. This step 506 may be performed immediately, after a particular delay (e.g., a number of seconds), or on the occurrence of a particular event (e.g., the events described in relation to step 502). While the steps of the method 500 are shown as discrete elements, one or more of the steps may be performed concurrently or substantially at the same time. For example, the server 300 may receive performance data, even while performance data is being analyzed, performance preferences are being updated, and/or the server 300 is being initialized.

Usage Example

The following paragraphs describe an example use of certain embodiments of the systems and methods described herein.

According to certain implementation, four users 404 are interested in playing a game using the system 1000, "PlayerOne", "PlayerTwo", "PlayerThree", and "PlayerFour". The users 404 begin by launching a game client on their respective remote consoles 400. The game client may be software installed or otherwise accessible from the user's remote console 400 that enables the user to control the game using a controller 402 and view video data. PlayerOne is playing the game on a smartphone and is using a touch screen on the smartphone as a controller 402. The video data is played on the screen as well. PlayerTwo is playing the game from a game client running on a video game console, is using a gamepad as a controller 402, and is viewing the video data using a virtual reality headset, which also serves as a secondary controller 402. PlayerThree is running the game client from a web application on a computer and begins by launching a web browser and navigating to a particular web address. PlayerThree is using a keyboard and mouse communicatively coupled to the computer as a controller 402 and will see the video data displayed on a computer monitor. PlayerFour is also running the game on a video game console, but does not have a virtual reality headset and will instead be viewing the video data on a television connected to the video game console.

The users 404 begin by logging into the server 300 using authentication information. PlayerOne logs in using a fingerprint scanner located on the smartphone. PlayerTwo and PlayerThree log in using a username and password. PlayerFour does not have an account yet, but registers with the server 300 by specifying a username, password, player information, and some initial preferences. The server 300 stores PlayerFour's registration information within a player database 332. The information for the other users 404 is already present in the database 332 and is used to confirm their log in credentials. The server 300 facilitates the login by ensuring the users 404 have properly authenticated themselves, for example, by comparing the received authentication information with stored values in a database.

PlayerOne has upgraded his smartphone since the last time he played but is currently playing over a low-bandwidth cellular connection. The server 300 detects this change by analyzing an information packet sent from the game client that contains information relating to the remote console 400 and the connection. The server 300 updates his entry in the player database 332 to include data about the new remote console 400 and alters his settings so PlayerOne receives highly compressed video data in order to alleviate the bandwidth constraints. The server 300 chooses an advanced video encryption format to take advantage of the faster processor of PlayerOne's new smartphone. The server 300 compares the remote consoles 400 and connections of PlayerTwo and PlayerThree with historical data and determines that no change is necessary from previous settings. The server 300 detects that PlayerFour is a first-time user and automatically configures PlayerFour's initial performance settings based on the settings of other users 404 playing on similar remote consoles 400 on similar connections.

The users 404 each specify that they would like to find a game. PlayerOne and PlayerTwo are friends, so they specify that they would like to join a game together and have no operations area 100 preference. PlayerThree owns a vehicle 110 located at a location called "RegionOne" and requests that she be connected to the next game played at that location. RegionOne is a location that comprises multiple operations areas 100 where users 404 may play. PlayerFour specifies that he has no location preference and would like to be connected to the soonest-available location. The server 300 receives the find-game request from the users 404 and adds them to a pool of other users 404 also looking for games. The server 300 places PlayerThree in a virtual lobby for the next game at RegionOne. RegionOne also happens to be the track with the next available opening so PlayerOne, PlayerTwo, and PlayerFour are all placed in the lobby. While the users 404 on in the lobby, the server 300 enables the users 404 to communicate to each other through voice chat and written messages.

The server 300 detects that everyone has successfully joined by querying their remote consoles 400. The server 300 then sends instructions to the remote consoles 400 of the users 404 to display a vote prompt, enabling the users 404 to vote on which operations area 100 of RegionOne the users 404 would like to use and which gameplay mode. The server 300 determines which voting choices to display by querying the base stations 130 within RegionOne for a status.

The server 300 receives responses from the base stations 130 that indicate that OperationsAreaOne is unavailable due to a tournament, OperationsAreaTwo is available for race and obstacle game modes, OperationsAreaThree is available for race, maze, and capture-the-flag game modes, and that OperationsAreaFour is unavailable because it is being cleaned. The server 300 then populates the vote options based on the status information. The users 404 vote and, after tallying the vote, the server 300 informs them that OperationsAreaTwo and the obstacle game mode have been chosen. The server 300 sends the results of the vote to the base station 130 at OperationsAreaTwo with instructions to prepare the operations area 100 for the obstacle game mode. The server 300 also sends the results to a referee 126 in charge of OperationsAreaTwo.

The base station 130 checks its state and determines that the previous game mode played there was the race game mode. The base station 130 then changes its game mode to the obstacle game mode. The base station 130 sends signals to actuators that control game elements 106 to move them into position. In response, an actuator controlling a ramp game element 106 raises the ramp from an undeployed position to a deployed position, and the base station 130 alters the properties of the virtual barrier 114 to cause the track 102 to change course and go through a region of bumpy terrain. The referee 126, in response to the instructions from the server 300, increases the difficulty of the track by scattering gravel throughout a particular part of the track 102 to reduce traction.

While OperationsAreaTwo is being prepared, the server 300 sends instructions to the users 404 to choose a vehicle 110 from a list of vehicles. The server 300 populates the list of vehicles 110 by querying the base station 130 for a list of the vehicles 110 at RegionOne and comparing the list to the selected operations area 100, game mode, vehicle database 330, and player database 332. The available vehicles 110 include air, water, and land vehicles, but the server 300 excludes water vehicles 110 because OperationsAreaTwo does not contain water. The server 300 also excludes air vehicles 110 from competing because the game mode does not support air vehicles; however, the server 300 leaves the air vehicles 110 available for spectating. The server 300 also analyzes the properties of certain vehicles 110 and customizes the vehicle list for each user 404.

The server 300 queries for PlayerOne's entry in the player database 332 and determines that PlayerOne is a premium member and has access to premium level vehicles 110 in addition to base-level vehicles. As such, the premium vehicles 110 are available to PlayerOne at no additional cost, and displayed in the vehicle list for PlayerOne as free options. Through a similar method, the server 300 determines that PlayerTwo, PlayerThree, and PlayerFour may choose the base level vehicles 110, choose to rent premium level vehicles 110, or purchase vehicles 110. PlayerOne chooses a premium level vehicle 110. PlayerTwo chooses to rent a premium level vehicle 110. The server 300 receives the rental request, loads PlayerTwo's stored payment information in the player database 332, and confirms that PlayerTwo would like to pay a fee to rent the vehicle. PlayerTwo confirms this, her choice is accepted, and the server 300 causes her to be billed for the cost of renting the vehicle 110. Because PlayerThree owns a vehicle 110 at RegionOne, that vehicle 110 is available to her but not to the other users 404. She chooses that vehicle 110. PlayerFour, being new, chooses to spectate the match by flying a base-level drone vehicle 110.

The server 300 receives these requests and sends instructions to the base station 130 to prepare the selected vehicles. The base station 130 responds by sending activation signals to the vehicles 110, running diagnostic checks to confirm the vehicles 110 are operational, and responds to the server 300 with connection information for the vehicles 110. The server 300 receives the connection information and uses it to establish connections between the vehicles 110 and their respective users 404. The server 300 detects that the vehicles 110 for PlayerOne and PlayerThree have autopilot options that enables the server 300 or base station 130 to drive the vehicles 110 to the starting line. The server 300 engages the autopilot feature and uses sensor data from the vehicles 110 to drive them to the starting line. The server 300 queries vehicle database 330 for information about PlayerTwo's vehicle 110 and determines that the vehicle 110 does not have an autopilot feature, so the server 300 sends a message to the referee 126 to move the vehicle 110 to the starting line manually. The referee 126 receives the message and does so. The server 300 also determines that PlayerFour's vehicle 110 is already on a launch pad and no further changes are needed before the match begins.

According to certain implementations, the server 300 confirms the vehicles are in the correct position for the competition to start. For instance, the server 300 may receive confirmation from sensors positioned on or near the track, such as sensors at or just behind the starting line, that the vehicles 110 for PlayerOne and PlayerThree have successfully been autopiloted to the starting line. In addition or alternatively, the vehicles 110 may confirm their positioning. In another example, such as PlayerTwo's vehicle 110, the referee 126 may transmit confirmation that the vehicle has been manually placed on the starting line. If the server 300 is unable to confirm correct positioning of each of the vehicles 110 within a specified period of time, e.g., one or two minutes before or after the competition is to begin, those vehicles with unconfirmed positioning may be disqualified, the referee 126 may be prompted to correctly position one of the vehicles, and/or the vehicle and associated player may be required to take a penalty in the competition.

Once the vehicles 110 are in the correct position, the server 300 begins to forward the video data from the vehicles 110 to the remote consoles of their respective operators. Each vehicle 110 has a camera, which collects video data of the area around the vehicle. Because PlayerTwo has a virtual reality headset with input controls, she enables a setting that causes her head movement to translate to movement of the camera 118. For example, if she turns her head to the left, a controller 402 in the headset sends a signal through the server 404 to the control system 122 of the vehicle 110, causing the camera 118 to rotate to the left.

The video data from a camera 404 attached to each vehicle 110 is encoded according to initial configuration instructions received from the server 300 that correspond to the preferences and settings for each of the users 404 stored in the player database 332. This video data is then wirelessly transmitted from the vehicle 110 to the base station 130, which performs additional processing, if necessary, and transmits the video data to the server 300. The server 300 receives the video data, performs additional processing, if necessary, and transmits the video data to the remote consoles of the users 404 for any necessary processing and display. The server 300 then performs diagnostics on the network and processing performance of each of the remote consoles 400 to determine whether parameters need to be changed before the match beings. The server does so by undergoing the method shown and described in FIG. 5, above. The server 300 detects that no change is necessary and that the match is ready to begin. As such, the server 300 sends a message that instructs the users 404 that the race will begin soon and starts a countdown clock. When the clock reaches zero, the users 404 are informed that the race has begun and the server 300 enables the users 404 to directly control their vehicles 110.

During the match, the users 404 use their respective controllers 402 to control the motion of their vehicles. The input is transmitted from the controller 402 to the remote console 400 to the server 300. The server 300 then transmits the input to the base station 130, which sends the input to the vehicle 110.

During the match, in addition to processing commands, the server 300 may synthesize match data for presentation to the users 404. For example, the server 300 may collect position data of the vehicles 110 and display it on a heads up display (HUD) that is overlaid on the real-time video data. The HUD may display information relating to current match time, current lap number, context-sensitive information (e.g., the vehicle 110 is leaving the gameplay area, the user 404 received an in-game message, the user 404 has earned an achievement, advertising information, or other context-sensitive information), score, speed, and other information. The HUD may also display a compass showing orientation, an arrow indicating a direction that the user 404 should travel, a mini-map (e.g., a top-down map that shows the location of the user 404 in relation to operations area 100 elements and other users 404), a picture-in-picture element (e.g., for showing video data from a secondary camera 118), and other display elements.

During the course of the match, PlayerOne takes an early lead with PlayerTwo not far behind. PlayerTwo attempts to pass PlayerOne by taking a turn sharply. While turning, PlayerTwo begins to head off course. As her vehicle 110 approaches the barrier 104, the server 300 receives information from the barrier 104 detailing how close PlayerTwo is to the barrier 104. As the distance decreases, the server 300 sends increasingly aggressive warning messages to PlayerTwo. First, PlayerTwo's screen flashes red, warning her that she may be heading off course, as she continues to approach the barrier 104, the server 300 sends instructions to her remote console 400 to cause PlayerTwo's controller 402 to vibrate. PlayerTwo uses this information to correct her orientation and successfully passes PlayerOne.

PlayerFour watches the pass from above and switches to a view from a sensor 108 on the ground to get a closer look. The server 300 receives the camera switch request, activates the chosen sensor 108 and transmits the video to PlayerFour's remote console 402. In addition, the server 300 detects that PlayerFour may not be able to as easily control his vehicle 110 from this view, so the server 300 engages autopilot for the vehicle 110. The vehicle 110 hovers and ignores control signals from PlayerFour until he switches back to the camera 118 on the vehicle 110.

Because PlayerFour is spectating, rather than directly competing, the server 300 prioritizes video data quality over control responsiveness for PlayerFour. The server 300 does so by enabling a one-second delay for the otherwise live video data. This additional time enables video data to be encoded using bi-directional frames because the server 300 has time to buffer and wait to see what the next frame is. The additional level of encoding means that the video quality is able to be increased for PlayerFour.

While being passed, PlayerOne's camera 118 becomes obscured by dirt and dust kicked up from the wheels of PlayerTwo's vehicle. The server 300, while performing image recognition on PlayerOne's video data, detects that the video is obscured beyond a 25% obfuscation threshold and takes action to correct PlayerOne's view. Specifically, the server 300 sends instructions to the base station 130 to activate various cameras 108 around the operations area 100 and send the video data to the server 300. The server 300 then sends a message to PlayerOne, informing him that a change will be made to his video data. The server 300 then uses position data for PlayerOne's vehicle 110 in order to determine which cameras 108 around the operations area 100 will show a view of the vehicle 110. The server 300 uses this data to act as a director and switch PlayerOne's video feed to cameras 108 around the track 102 that will show his vehicle 110. The server 300 also moves the camera feed from the camera 118 on the vehicle 110 to a picture-in-picture window on the screen of PlayerOne's phone. The server 300 detects that this will require additional bandwidth resources, reduces the quality of the picture-in-picture to balance resource costs of adding the video data in this mode.

In addition, while playing, PlayerOne's cell phone picks up WiFi™ reception and his network performance improves significantly. The server 300 detects that PlayerOne has increased bandwidth and decreased latency through the method described in FIG. 5, so the server 300 causes the video data quality to improve from 24 frames per second to 48 frames per second.

During the course of the match, PlayerThree's computer crashes, causing her to lose connection with the server 300. The server 300 detects that it is not receiving input information from PlayerThree and that PlayerThree's remote console 400 is not responding to ping requests. In response, the sever 300 activates the auto-pilot module 326 and takes control of PlayerThree's vehicle 110. The server 300 uses position data, location data, and other information relating to the vehicle 110 to guide the vehicle 110 at a leisurely pace around the track 102. PlayerThree reboots her computer, and logs back in to the server 300. The server 300 detects that PlayerThree is attempting to reconnect and has a match in progress, so the server 300 sends a message to her remote console asking her if she would like to reconnect to her match in progress or forfeit the match. PlayerThree chooses to reconnect. The server 300 reestablishes the connection, runs a diagnostic test on the remote console 400 to ensure that is in a playable state, and then displays a countdown timer showing how long until PlayerThree will resume control of the vehicle 110. PlayerThree resumes control and continues the match.

What is claimed is:

1. A method of managing a real-time video feed based multiplayer gaming system, the method comprising:
   receiving captured video data from a vehicle associated with a user; encoding the captured video data using multi-slice parallelism, key and predicted frames, and forward error correction;
   sending the captured video data to a remote console associated with the user;
   receiving input from the user;
   transmitting the input to the vehicle associated with the user;
   further comprising modifying a performance parameter of the vehicle using a network performance metric or a processing performance metric corresponding to the remote console;
   wherein the performance parameter of the vehicle comprises speed of the vehicle.

2. The method of claim 1, wherein encoding the captured video data comprises encoding the captured video data based on a network performance metric or a processing performance metric corresponding to the remote console.

3. The method of claim 1, further comprising:
   receiving log in credentials from the user; and
   associating the vehicle with the user using the credentials.

4. The method of claim 1, wherein receiving the captured video data comprises receiving the captured video data through a base station; and wherein transmitting the input to the vehicle comprises transmitting the input to the base station.

5. The method of claim 1, further comprising transcoding the captured video data in response to detecting decreased network performance.

6. The method of claim 1, further comprising receiving a plurality of connection requests from a plurality of remote consoles and associating each of the plurality of remote consoles with at least one of a plurality of vehicles.

* * * * *